US012723666B2

(12) United States Patent
Lin et al.

(10) Patent No.: US 12,723,666 B2
(45) Date of Patent: Sep. 1, 2026

(54) DUAL-TANK CONTROL VALVE STRUCTURE

(71) Applicant: Canature Health Technology Group Co., Ltd., Shanghai (CN)

(72) Inventors: Hekun Lin, Shanghai (CN); Chao Zheng, Shanghai (CN)

(73) Assignee: Canature Health Technology Group Co., Ltd., Shanghai (CN)

( * ) Notice: Subject to any disclaimer, the term of this patent is extended or adjusted under 35 U.S.C. 154(b) by 0 days.

(21) Appl. No.: 19/125,539

(22) PCT Filed: Apr. 26, 2023

(86) PCT No.: PCT/CN2023/090738
§ 371 (c)(1),
(2) Date: Apr. 29, 2025

(87) PCT Pub. No.: WO2024/148711
PCT Pub. Date: Jul. 18, 2024

(65) Prior Publication Data
US 2026/0177157 A1 Jun. 25, 2026

(30) Foreign Application Priority Data
Jan. 10, 2023 (CN) ......................... 202310033491.9

(51) Int. Cl.
*F16K 11/22* (2006.01)
*F16K 11/07* (2006.01)
(Continued)

(52) U.S. Cl.
CPC .......... *F16K 11/22* (2013.01); *F16K 11/0716* (2013.01); *F16K 27/041* (2013.01);
(Continued)

(58) Field of Classification Search
CPC ..... F16K 11/0716; F16K 11/22; F16K 27/041
See application file for complete search history.

(56) References Cited

U.S. PATENT DOCUMENTS 5,096,596 A * 3/1992 Hellenbrand ............. C02F 9/20
210/138
5,628,899 A * 5/1997 Vaughan .................. C02F 1/42
137/625.46
(Continued)

FOREIGN PATENT DOCUMENTS

CN 101407345 A 4/2009
CN 203948712 U 11/2014
(Continued)

OTHER PUBLICATIONS

FR 2891164 Translation (Year: 2005).*
(Continued)

*Primary Examiner* — Umashankar Venkatesan
(74) *Attorney, Agent, or Firm* — DILWORTH IP, LLC

(57) ABSTRACT

A dual-tank control valve structure includes a main valve assembly connected to an auxiliary valve assembly by an upper opening connector and a central tube connector. The main valve assembly comprises: a valve body where a regeneration piston cavity and a switching piston cavity are formed. The regeneration piston cavity is sequentially divided into multiple cavities, and the endmost cavity communicates with the endmost switching cavity. The switching piston cavity is sequentially divided into multiple cavities; a switching piston is inserted into a first switching piston cavity; a regeneration piston is inserted into a first regeneration piston cavity; a water inlet communicates with a certain switching cavity; a water outlet communicates with another switching cavity; a drainage port communicates with a certain regeneration cavity; and a tank body connect-
(Continued)

ing base is connected to the valve body and communicates with a second and a sixth switching cavity.

7 Claims, 9 Drawing Sheets

(51) Int. Cl.
*F16K 27/04* (2006.01)
*C02F 1/42* (2023.01)

(52) U.S. Cl.
CPC .......... *C02F 1/42* (2013.01); *C02F 2201/005* (2013.01); *C02F 2303/16* (2013.01); *Y02E 60/16* (2013.01)

(56) References Cited

U.S. PATENT DOCUMENTS

| | | | | |
|---|---|---|---|---|
| 5,650,064 | A | 7/1997 | Ferrali | |
| 8,961,797 | B2 | 2/2015 | Vaughan | |
| 2002/0117217 | A1* | 8/2002 | Liesenhoff | F15B 13/0402 137/596.18 |
| 2012/0312749 | A1* | 12/2012 | Chandler, Jr. | C02F 1/42 210/687 |
| 2014/0261697 | A1 | 9/2014 | Vaughan | |

FOREIGN PATENT DOCUMENTS

| | | | | | |
|---|---|---|---|---|---|
| CN | 104235434 | A | | 12/2014 | |
| CN | 104235458 | A | | 12/2014 | |
| CN | 109133266 | A | | 1/2019 | |
| CN | 110272093 | A | | 9/2019 | |
| CN | 110410530 | A | | 11/2019 | |
| CN | 210367076 | U | * | 4/2020 | C02F 1/42 |
| CN | 114593237 | A | | 6/2022 | |
| CN | 115978247 | A | | 4/2023 | |
| CN | 219299996 | U | | 7/2023 | |
| FR | 2891164 | A1 | * | 3/2007 | C02F 1/42 |
| WO | WO-9727413 | A1 | * | 7/1997 | C02F 1/42 |
| WO | 2016/020621 | A2 | | 2/2016 | |

OTHER PUBLICATIONS

CN-210367076 Translation (Year: 2020).*

Office Action and Search Report received for Chinese Application No. 202310033491.9, mailed on Jul. 24, 2025, 17 pages (7 pages of original office action and 10 pages of English Translation).

International Search Report issued in PCT Application No. PCT/CN2023/090738 mailed on Sep. 18, 2023.

* cited by examiner

DUAL-TANK CONTROL VALVE STRUCTURE

TECHNICAL FIELD

The present disclosure relates to the field of water treatment, and in particular, to a dual-tank control valve structure for a water softening device.

BACKGROUND

Currently, a primary valve body of a dual-tank control valve with one tank in use and one tank on standby that is commonly used in a soft water treatment device is mostly of a dual-piston structure similar to that of the U.S. Fleck control 9000/9100/9500, in which an upper piston controls regeneration processes such as salt suction, backwashing, washing, and water injection in a regeneration tank body, and a lower piston controls a process of switching between the two tanks, that is, one is in operation to produce water, and the other is communicated with the upper portion to complete the regeneration process and then in a standby state.

When the aforementioned structure is in operation, it is necessary to have at least three waterways within the lower piston chamber, namely the regenerated feed water, the upper opening of the regeneration tank, and the center pipe, each of which is connected to the upper piston chamber for the switching of the regeneration process, which are separately communicated with an upper piston chamber to perform a switch of the regeneration process. At the same time, it is required to provide two waterways of an upper opening and a center pipe of a primary tank in the lower piston chamber, which are communicated with a smaller threaded tank opening of the primary tank. Since there are many passages and the piston chamber is long, the structure is complex. In this case, the primary valve body is divided into three parts or two parts, which are formed separately by means of injection molding process and then welded into a whole by means of a plastic welding technique such as hot plate welding or friction welding. Accordingly, the process is complex and the first-pass yield is low, causing high costs, and there is a potential risk of leakage.

The Chinese patent app. no. CN202210158144.4 (published as CN114593237A on Jun. 7, 2022) discloses a multi-way valve, a water softener, and a method for controlling the water softener. The multi-way valve is provided with a primary valve and a secondary valve. When the primary valve and secondary valve are in a bypass valve position, a water inlet channel of the multi-way valve, a first primary valve channel, a first secondary valve channel, a second secondary valve channel, a second primary valve channel, a water outlet channel are communicated with each other in sequence, to form a bypass flow path in the valves, so that a bypass function may be implemented without additionally mounting an external bypass valve on a water supply pipeline of a user, avoiding the additional risk of water leakage caused by the external bypass valve. The waterway structure disclosed in this solution is complex and difficult to be molded in a process, which is not conducive to production and manufacturing.

The Chinese patent app. No. CN201810934213.X (published as CN109133266A on Jan. 4, 2019) discloses a dual-tank soft water control valve and a water treatment system, including a primary valve component and a secondary valve component, where the primary valve component controls the switching between working and regeneration states of the two resin tanks, and the secondary valve component controls the switching of a waterway during resin regeneration within the resin tank in the regeneration state. The waterway structure disclosed in this solution is complex and difficult to be molded in a process, which is not conducive to production and manufacturing.

In the U.S. Pat. No. 8,961,797B2, although its switching chamber is in the form of circular sheet rotation without using the above piston, the principle is the same as above, and communication between a plurality of waterways is also required. Thus, it is also formed by welding a plurality of components and is difficult to be molded in a process, which is not conducive to production and manufacturing.

The primary valve body of the prior art cannot be formed integrally by means of injection molding process. Even if it is formed integrally by means of metal casting, fine machining of the chamber is also required, resulting in a very high cost of a single piece, and the casting process may pollute the environment and thus is gradually being phased out.

To sum up, there is an urgent need for a dual-tank control valve structure for a water softening device that has a simple structure and that is easy to be produced and machined.

BRIEF SUMMARY

A series of concepts in a simplified form is introduced in this section Summary, and all the concepts in a simplified form are simplified prior art, which will be described in detail in the section Detailed Description of Embodiments. This Summary of the present disclosure is neither intended to define key features or necessary technical features of the claimed technical solutions, nor is it intended to attempt to determine the protection scope of the claimed technical solutions.

The technical problem to be solved by the present disclosure is to provide a dual-tank control valve structure having a simple structure, particularly a simple waterway construction, which facilitates production and manufacturing.

In order to solve the above technical problem, the present disclosure provides a dual-tank control valve structure including: a primary valve assembly 1 connected to an auxiliary valve assembly 2 via an auxiliary tank upper opening connection port 13 and an auxiliary tank center pipe connection port 14;

the primary valve assembly 1 including:

a primary valve body 3 in which a regeneration piston chamber 11 and a switching piston chamber 12 arranged adjacent to each other in juxtaposition are formed;

the regeneration piston chamber 11 in which a plurality of seals are arranged at intervals, the seals dividing the regeneration piston chamber 11 into regeneration chamber I to regeneration chamber V 21-25 arranged in sequence from a chamber opening to a chamber bottom;

the switching piston chamber 12 in which a plurality of seals are arranged at intervals, the seals dividing the switching piston chamber 12 into switching chamber I to switching chamber IX 31-39 arranged in sequence from a chamber opening to a chamber bottom;

a switching piston 16 inserted into the chamber opening of the switching piston chamber 12 and slidable in the seal;

a regeneration piston 15 inserted into the chamber opening of the regeneration piston chamber 11 and slidable in the seal;

a water inlet 5 communicated with the switching chamber VII 37;

a water outlet 6 communicated with the switching chamber III 33;

a water discharge port 7 communicated with the regeneration chamber I 21; and a tank body connection seat 4 connected to the primary valve body 3 via a snap-in connection port, where the regeneration chamber II 22 is aligned with the switching chamber I 31 and communicated with the switching chamber I 31 via a groove I 18, the regeneration chamber IV 24 is aligned with the switching chamber III 33 and communicated with the switching chamber III 33 via a groove II 19, and the regeneration chamber V 25 is communicated with the switching chamber IX 39.

Optionally, in the improved dual-tank control valve structure, the switching chamber II 32 is communicated with a center pipe of a primary tank, and the switching chamber IV 34 is communicated with a center pipe of an auxiliary tank; or the switching chamber II 32 is communicated with the center pipe of the auxiliary tank, and the switching chamber IV 34 is communicated with the center pipe of the primary tank;

and correspondingly, the switching chamber VI 36 is communicated with a primary tank upper opening, and the switching chamber VIII 38 is communicated with an auxiliary tank upper opening; or the switching chamber VI 36 is communicated with the auxiliary tank upper opening, and the switching chamber VIII 38 is communicated with the primary tank upper opening.

Optionally, in the improved dual-tank control valve structure, the primary valve body is formed integrally by means of injection molding process, the groove I 18 and the groove II 19 are formed by means of machining cut molding, and the regeneration chamber V 25 and switching chamber IX 39 are communicated with each other by means of process core pulling and sealed with a process plug.

Optionally, in the improved dual-tank control valve structure, the tank body connection seat 4 is formed in the form of a snap-fit port, and an outer ring of the tank body connection seat 4 is provided with a flange used for screwing or detaching the tank body.

Optionally, to further improve the dual-tank control valve structure, the size of the snap-fit port of the tank body connection seat is much greater than the size of a tank opening and may be accommodated into a spacing between upper and lower opening communication chambers and collapsed by the center pipe connector. At the same time, since the primary valve body is directional and a tank body thread is nondirectional, the primary valve body first screwed by means of the tank body connection seat is adjustable in any direction, thereby facilitating mounting and use.

Optionally, in the improved dual-tank control valve structure, the auxiliary valve assembly 2 is provided with the tank body connection seat 4 and the center pipe connector 9 of the same structure at a center pipe connection thereof, the tank body connection seat 4 is connected to an auxiliary valve body by means of a snap-in connection port, and the center pipe connector 9 is connected to the switching chamber IV 34 or the switching chamber II 32 via the auxiliary tank center pipe connection port 14.

In the dual-tank control valve structure provided by the present disclosure, waterways and positions of individual chambers in the upper and lower piston chambers are redesigned, so that two of three communicated waterways are located on certain planes (achieved by aligning the chamber positions), and the other waterway is formed only by communicating tail ends of two chambers, avoiding a complex meandering waterway. As such, the dual-tank control valve structure may be formed integrally by means of simple injection molding, facilitating production and manufacturing, reducing manufacturing costs, and meeting the demand of production application.

BRIEF DESCRIPTION OF THE DRAWINGS

The drawings of the present disclosure are intended to illustrate general characteristics of methods, structures and/or materials used in particular exemplary embodiments according to the present disclosure, to supplement the content in the description. However, the drawings of the present disclosure are schematic drawings that are not drawn to scale and thus may not accurately reflect the precise structure or performance characteristics of any given embodiment, and the drawings of the present disclosure should not be construed as limiting or restricting the scope of values or attributes encompassed by the exemplary embodiments according to the present disclosure. The present disclosure is further described in detail below with reference to the drawings and specific embodiments.

LIST OF REFERENCE NUMERALS

Figure 1:
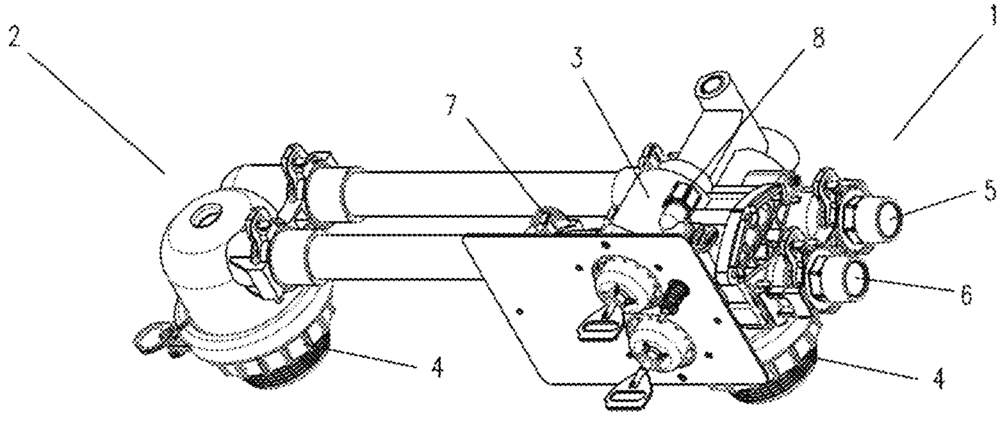
FIG. 1 is a schematic diagram of an appearance according to an embodiment of the present disclosure.
Figure 2:
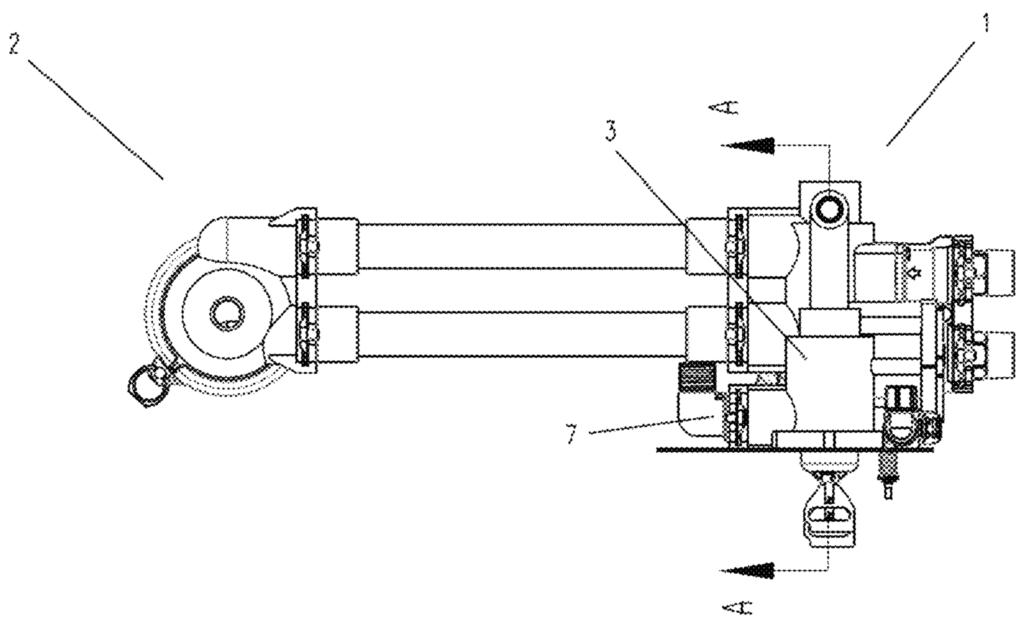
FIG. 2 is a top view according to an embodiment of the present disclosure.
Figure 3:
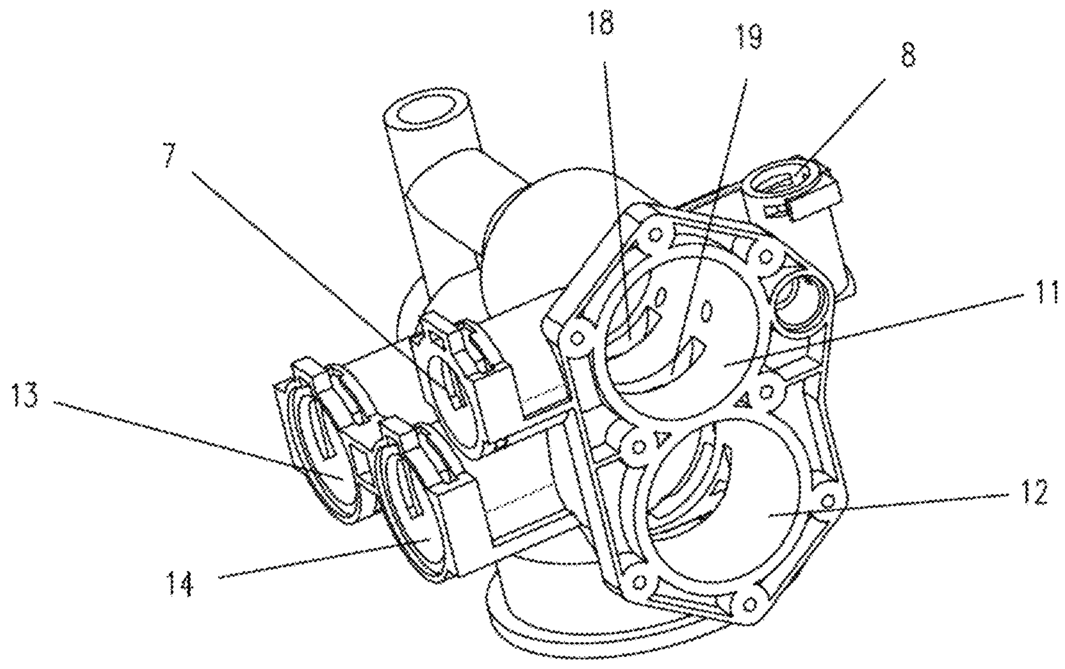
FIG. 3 is a schematic diagram of an appearance of a primary valve body according to an embodiment of the present disclosure.

1 Primary valve assembly
2 Auxiliary valve assembly
3 Primary valve body
4 Tank body connection seat
5 Water inlet
6 Water outlet
7 Water discharge port
8 Salt suction port

9 Center pipe connector
11 Regeneration piston chamber
12 Switching piston chamber
13 Auxiliary tank upper opening connection port
14 Auxiliary tank center pipe connection port
15 Regeneration piston
16 Switching piston
17 Process plug
18 Groove I
19 Groove II
21 Regeneration chamber I
22 Regeneration chamber II
23 Regeneration chamber III
24 Regeneration chamber IV
25 Regeneration chamber V
31 Switching chamber I
32 Switching chamber II
33 Switching chamber III
34 Switching chamber IV
35 Switching chamber V
36 Switching chamber VI
37 Switching chamber VII
38 Switching chamber VIII
39 Switching chamber IX
50 Adapter port I
91 Adapter port II
92 Center pipe connection port

DETAILED DESCRIPTION OF THE DISCLOSURE

The embodiments of the present disclosure are described below using specific examples, and those skilled in the art could fully understand other advantages and technical effects of the present disclosure from the contents disclosed in the description. The present disclosure can also be implemented or applied via different specific implementations, and various details in the description can also be applied based on different viewpoints and modified or changed without departing from the general design idea of the present disclosure. It should be noted that the embodiments below and features in the embodiments can be combined with each other without conflict. The following exemplary embodiments of the present disclosure may be implemented in many different forms and should not be construed as being limited to the specific embodiments set forth herein. It should be understood that these embodiments are provided to make the present disclosure thorough and complete and to fully convey the technical solutions of these exemplary specific embodiments to those skilled in the art. It should be understood that when an element is referred to as being "connected" or "bonded" to another element, the element may be directly connected or bonded to the other element, or there may be an intermediate element. On the contrary, when an element is referred to as being "directly connected" or "directly bonded" to another element, there is no intermediate element. Throughout the drawings, the same reference numeral always denotes the same element. As used herein, the term "and/or" includes any and all combinations of one or more of the relevant items listed.

Embodiment 1

Referring to FIGS. 1-4, the present disclosure provides a dual-tank control valve structure, which is applicable to a water softener and includes: a primary valve assembly 1 connected to an auxiliary valve assembly 2 via an auxiliary tank upper opening connection port 13 and an auxiliary tank center pipe connection port 14;

a primary valve body 3 in which a regeneration piston chamber 11 and a switching piston chamber 12 arranged adjacent to each other in juxtaposition are formed;

the regeneration piston chamber 11 in which a plurality of seals are arranged at intervals, the seals dividing the regeneration piston chamber 11 into regeneration chamber I to regeneration chamber V 21-25 arranged in sequence from a chamber opening to a chamber bottom;

the switching piston chamber 12 in which a plurality of seals are arranged at intervals, the seals dividing the switching piston chamber 12 into switching chamber I to switching chamber IX 31-29 arranged in sequence from a chamber opening to a chamber bottom;

a switching piston 16 inserted into the chamber opening of the switching piston chamber 12 and slidable in the seal;

a regeneration piston 15 inserted into the chamber opening of the regeneration piston chamber 11 and slidable in the seal;

a water inlet 5 communicated with the switching chamber VII 37;

a water outlet 6 communicated with the switching chamber III 33;

a water discharge port 7 communicated with the regeneration chamber I 21; and a tank body connection seat 4 connected to the primary valve body 3 via a snap-in connection port, where the regeneration chamber II 22 is aligned with the switching chamber I 31 and communicated with the switching chamber I 31 via a groove I 18, the regeneration chamber IV 24 is aligned with the switching chamber III 33 and communicated with the switching chamber III 33 via a groove II 19, and the regeneration chamber V 25 is communicated with the switching chamber IX 39.

Optionally, in the improved first embodiment, the switching chamber II 32 is communicated with a center pipe of a primary tank, and the switching chamber IV 34 is communicated with a center pipe of an auxiliary tank; or the switching chamber II 32 is communicated with the center pipe of the auxiliary tank, and the switching chamber IV 34 is communicated with the center pipe of the primary tank.

Optionally, in the improved first embodiment, the switching chamber VI 36 is communicated with a primary tank upper opening, and the switching chamber VIII 38 is communicated with an auxiliary tank upper opening; or the switching chamber VI 36 is communicated with the auxiliary tank upper opening, and the switching chamber VIII 38 is communicated with the primary tank upper opening.

Optionally, in the improved first embodiment, the primary valve body is formed integrally by means of injection molding process, the groove I and the groove II are formed by means of machining cut molding, and the regeneration chamber V 25 and switching chamber IX 39 are communicated with each other by means of process core pulling and sealed with a process plug.

Optionally, in the improved first embodiment, the tank body connection seat 4 is formed in the form of a snap-fit port, and an outer ring of the tank body connection seat 4 is provided with a flange used for screwing or detaching the tank body.

Furthermore, it should also be understood that although the terms "first", "second", etc. may be used herein to describe different elements, parameters, components, regions, layers and/or portions, these elements, parameters, components, regions, layers and/or portions should not be limited by these terms. These terms are used only to distinguish one element, parameter, component, region, layer, or portion from another element, parameter, component, region, layer, or portion. Accordingly, without departing from the teachings of the exemplary embodiments according to the present disclosure, the first element, parameter, component, region, layer or portion discussed below may also be referred to as a second element, parameter, component, region, layer or portion. For descriptive purposes, spatially relative terms such as "under . . . ", "over . . . ", "below", "above", and "upper" may be used here to describe the spatial relationship of an element or feature with respect to another element or feature as shown in the figure.

Embodiment 2

Figure 4:
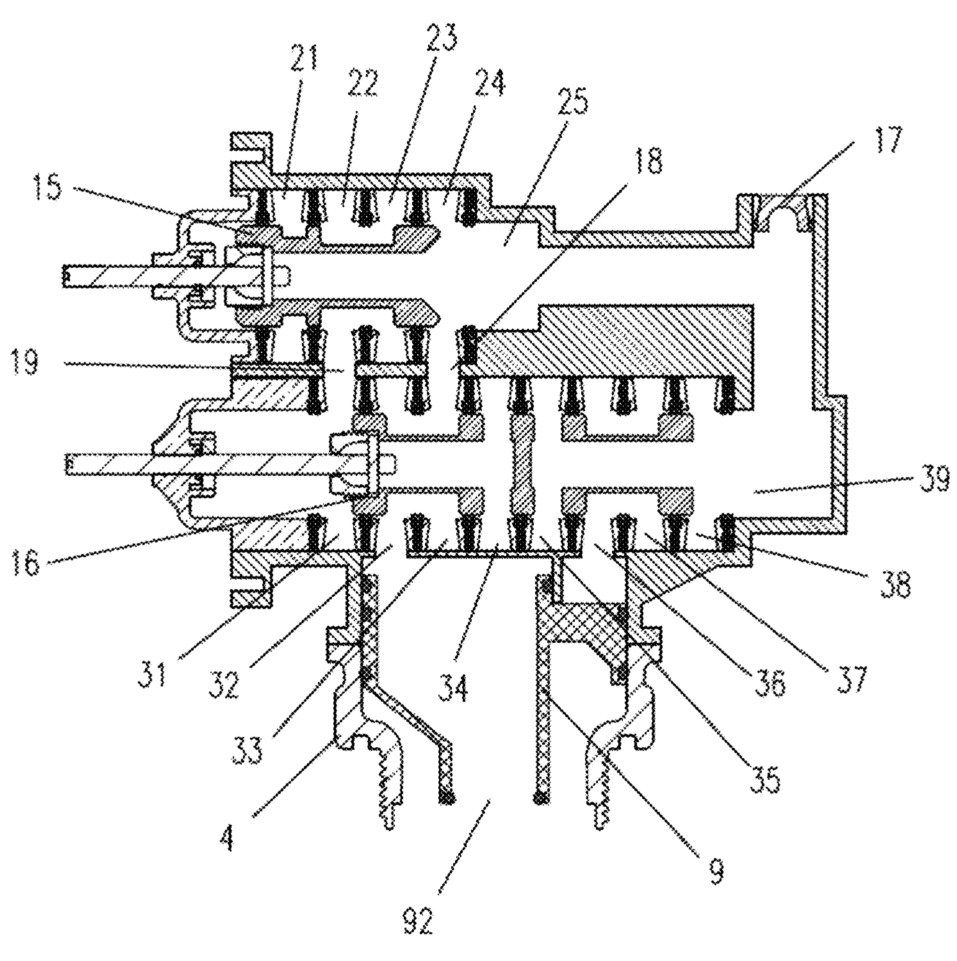
FIG. 4 is an A-A sectional view of FIG. 2.
Figure 5:
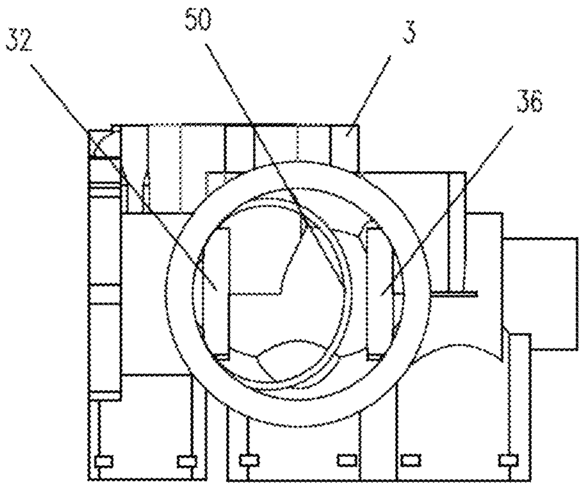
FIG. 5 is an upward view of the primary valve body according to an embodiment of the present disclosure.
Figure 6:
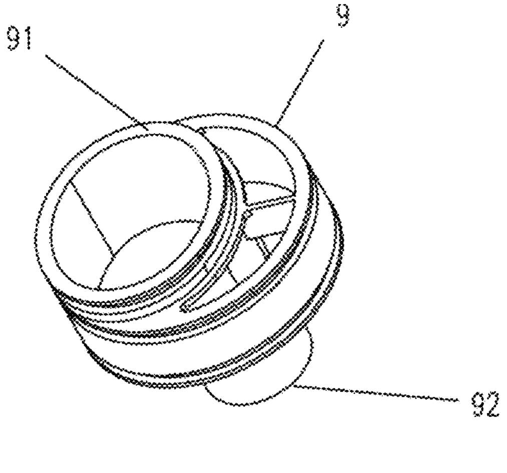
FIG. 6 is a schematic diagram of an appearance of a center pipe connector according to an embodiment of the present disclosure.

Referring to FIGS. 5 and 6 in conjunction with FIG. 4, the present disclosure provides the primary valve assembly 1 that may be used for the first embodiment and improvements thereof, which further includes:

- a center pipe connector 9 located between the primary valve body 3 and the tank body connection seat 4;
- the center pipe connecting member 9 having an end provided with an adapter port II 91, the adapter port II 91 being communicated with the switching chamber II 32 via an adapter port I 50, and the other end provided with a center pipe connection port 92 being connected to the center pipe.

Optionally, in the improved dual-tank control valve structure, the auxiliary valve assembly 2 is provided with the tank body connection seat 4 and the center pipe connector 9 of the same structure at a center pipe connection thereof, the tank body connection seat 4 is connected to an auxiliary valve body by means of a snap-in connection port, and the center pipe connector 9 is connected to the switching chamber IV 34 or the switching chamber II 32 via the auxiliary tank center pipe connection port 14.

Figure 7:
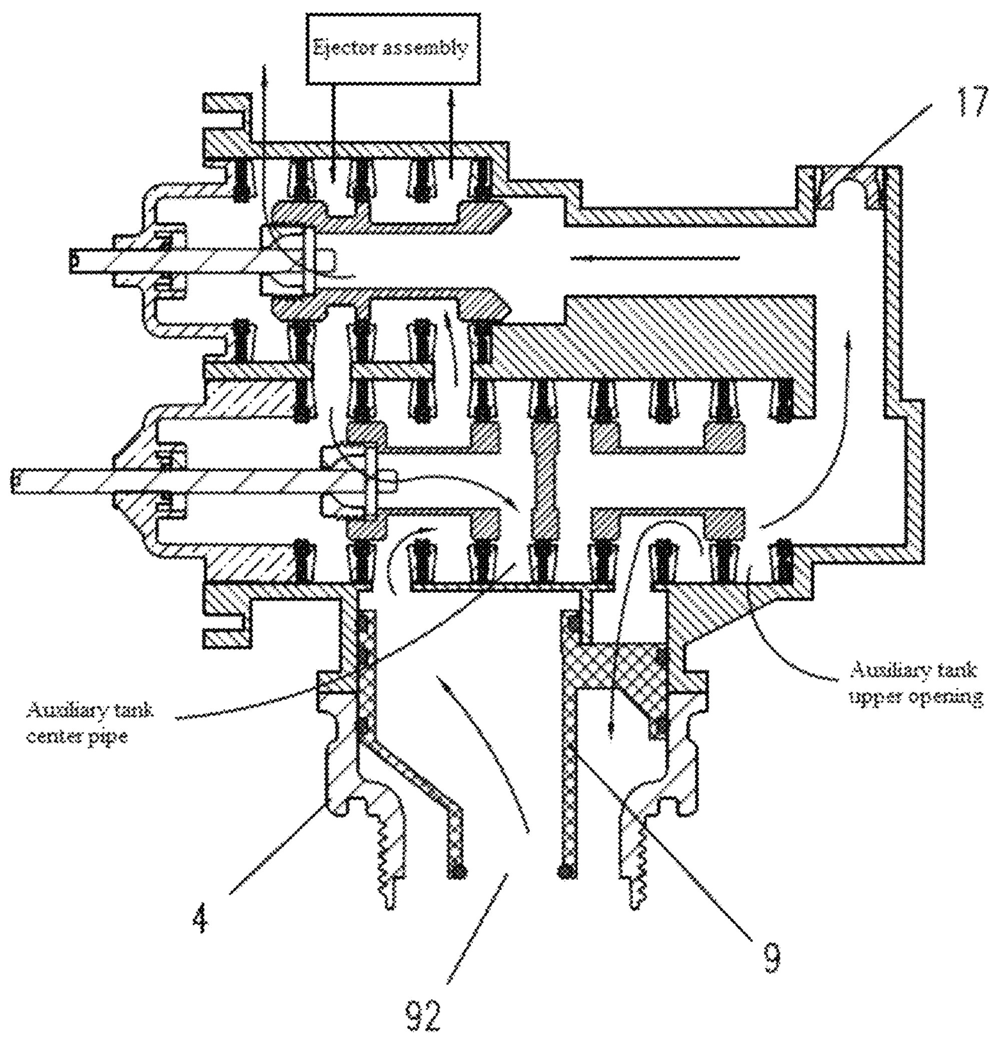
FIG. 7 is a schematic diagram of water flow during a process in which a primary tank operates and an auxiliary tank undergoes reverse flow for salt suction according to an embodiment.

Referring to FIG. 7, which is a schematic diagram of water flow during a process in which a primary tank operates and an auxiliary tank undergoes reverse flow for salt suction in the dual-tank control valve structure provided by the embodiment of the present disclosure, an arrow in the figure represents the direction of the water flow.

Figure 8:
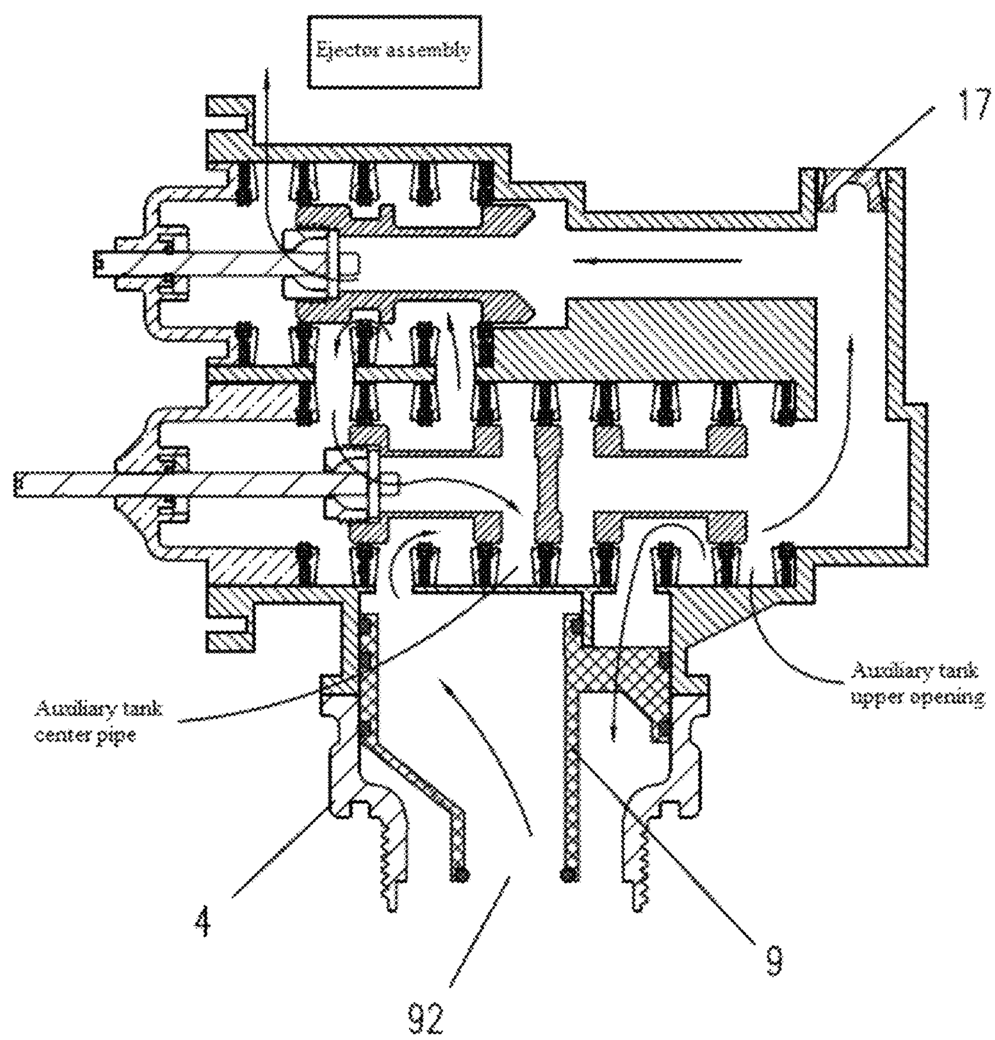
FIG. 8 is a schematic diagram of water flow during a process in which the primary tank operates and the auxiliary tank undergoes backwashing according to an embodiment.

Referring to FIG. 8, which is a schematic diagram of water flow during a process in which the primary tank operates and the auxiliary tank undergoes backwashing in the dual-tank control valve structure provided by the embodiment of the present disclosure, an arrow in the figure represents the direction of the water flow.

Figure 9:
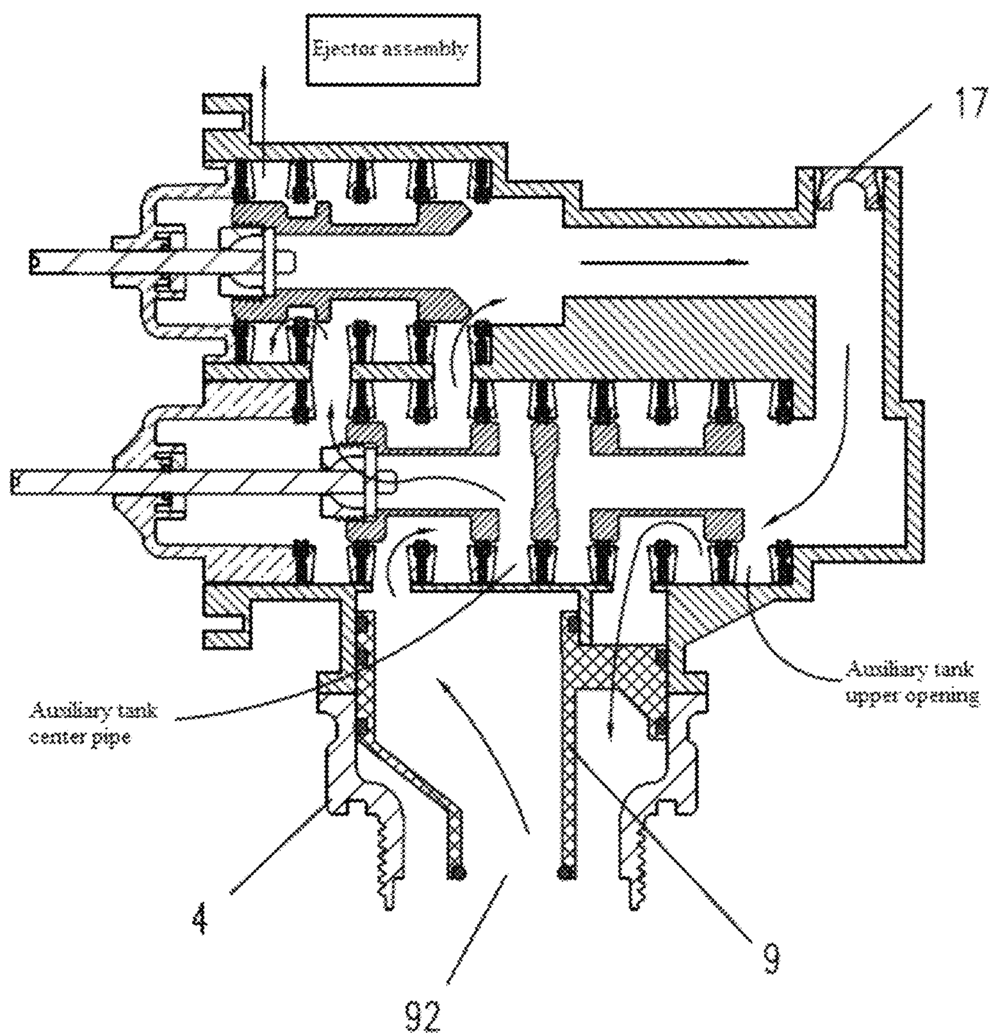
FIG. 9 is a schematic diagram of water flow during a process in which the primary tank operates and the auxiliary tank undergoes washing according to an embodiment.

Referring to FIG. 9, which is a schematic diagram of water flow during a process in which the primary tank operates and the auxiliary tank undergoes washing in the dual-tank control valve structure provided by the embodiment of the present disclosure, an arrow in the figure represents the direction of the water flow.

Figure 10:
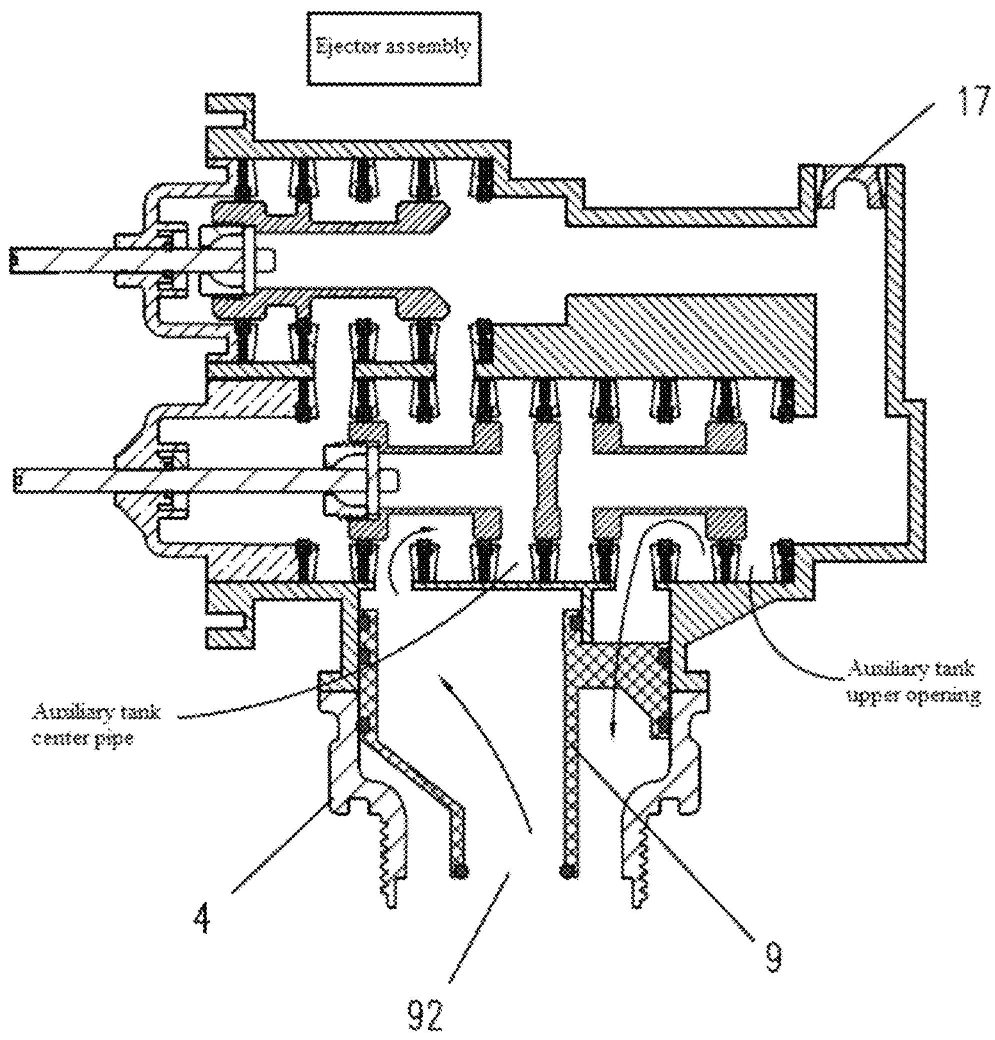
FIG. 10 is a schematic diagram of water flow during a process in which the primary tank operates and the auxiliary tank is on standby according to an embodiment.

Referring to FIG. 10, which is a schematic diagram of water flow during a process in which the primary tank operates and the auxiliary tank is on standby in the dual-tank control valve structure provided by the embodiment of the present disclosure, an arrow in the figure represents the direction of the water flow.

Figure 11:
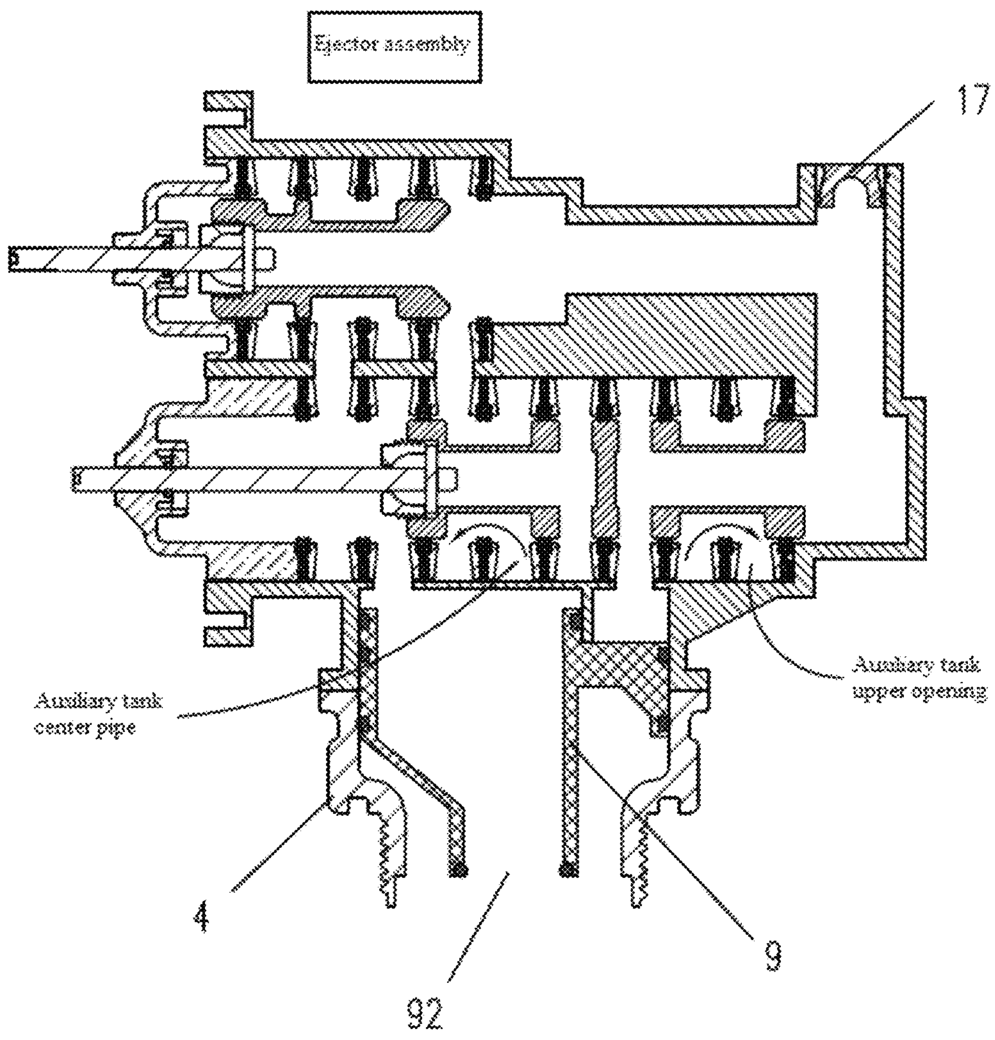
FIG. 11 is a schematic diagram of water flow during a process in which the auxiliary tank operates and the primary tank is on standby according to an embodiment.

Referring to FIG. 11, which is a schematic diagram of water flow during a process in which the auxiliary tank operates and the primary tank is on standby in the dual-tank control valve structure provided by the embodiment of the present disclosure, an arrow in the figure represents the direction of the water flow.

Unless otherwise defined, all terms (including technical and scientific terms) used herein have the same meanings as those commonly understood by those of ordinary skills in the field to which the present disclosure pertains. It will also be understood that, unless expressly defined herein, the terms such as those defined in general-purpose dictionaries should be construed as having meanings consistent with their meanings in the context of the relevant field, and are not construed in an ideal or overly formal sense.

The present disclosure is described in detail above through specific implementations and embodiments that, however, do not impose limitations to the present disclosure. Without departing from the principle of the present disclosure, a skilled in the art may also made many other deformations and improvements, which should also be considered as the scope of protection of the present disclosure.

What is claimed is:

1. A dual-tank control valve structure, comprising: a primary valve assembly connected to an auxiliary valve assembly via an auxiliary tank upper opening connection port and an auxiliary tank center pipe connection port;

the primary valve assembly comprising:

- a primary valve body in which a regeneration piston chamber and a switching piston chamber arranged adjacent to each other in juxtaposition are formed;
- the regeneration piston chamber in which a plurality of seals are arranged at intervals, the seals dividing the regeneration piston chamber into regeneration chamber I to regeneration chamber V arranged in sequence from a chamber opening to a chamber bottom;
- the switching piston chamber in which a plurality of seals are arranged at intervals, the seals dividing the switching piston chamber into switching chamber I to switching chamber IX arranged in sequence from a chamber opening to a chamber bottom;
- a switching piston inserted into the chamber opening of the switching piston chamber and slidable in the seal;
- a regeneration piston inserted into the chamber opening of the regeneration piston chamber and slidable in the seal;
- a water inlet communicated with the switching chamber VII;
- a water outlet communicated with the switching chamber III;
- a water discharge port communicated with the regeneration chamber I; and
- a tank body connection seat connected to the primary valve body via a snap-in connection port,
- wherein the regeneration chamber II is aligned with the switching chamber I and communicated with the switching chamber I via a groove I, the regeneration chamber IV is aligned with the switching chamber III and communicated with the switching chamber III via a groove II, and the regeneration chamber V is communicated with the switching chamber IX.

2. The dual-tank control valve structure according to claim 1, wherein

- the switching chamber II is communicated with a center pipe of a primary tank, and the switching chamber IV is communicated with a center pipe of an auxiliary tank; or the switching chamber II is communicated with the center pipe of the auxiliary tank, and the switching chamber IV is communicated with the center pipe of the primary tank;

and correspondingly, the switching chamber VI is communicated with a primary tank upper opening, and the switching chamber VIII is communicated with an auxiliary tank upper opening; or the switching chamber VI is communicated with the auxiliary tank upper opening, and the switching chamber VIII is communicated with the primary tank upper opening.

3. The dual-tank control valve structure according to claim 1, wherein the primary valve body is formed integrally by means of injection molding process, the groove I and the groove II are formed by means of machining cut molding, and the regeneration chamber V and switching chamber IX are communicated with each other by means of process core pulling.

4. The dual-tank control valve structure according to claim 1, wherein the primary valve assembly further comprises:

a center pipe connector located between the primary valve body and the tank body connection seat;

the center pipe connecting member having an end provided with an adapter port II, the adapter port II being communicated with the switching chamber II or the switching chamber IV via an adapter port I, and the other end being connected to the center pipe.

5. The dual-tank control valve structure according to claim 4, wherein the auxiliary valve assembly is provided with the tank body connection seat and the center pipe connector of the same structure at a center pipe connection thereof, the tank body connection seat is connected to an auxiliary valve body by means of a snap-in connection port, and the center pipe connector is connected to the switching chamber IV or the switching chamber II via the auxiliary tank center pipe connection port.

6. The dual-tank control valve structure according to claim 1, wherein the tank body connection seat is provided with a connection portion used for connection with a tank body.

7. The dual-tank control valve structure according to claim 6, wherein the connection portion is formed in the form of a snap-fit port, and an outer ring of the tank body connection seat is provided with a flange used for screwing or detaching the tank body.

* * * * *